United States Patent [19]

Nakamura et al.

[11] Patent Number: 5,295,414
[45] Date of Patent: Mar. 22, 1994

[54] VIBRATION AND NOISE PROOFING SYSTEM FOR A HYDROSTATIC STEPLESS TRANSMISSION ATTACHED TO A TRANSMISSION CASE

[75] Inventors: Tadashi Nakamura; Kenzo Ushiro; Hirofumi Iritani; Eiishi Ishida, all of Osaka, Japan

[73] Assignee: Kubota Corporation, Osaka, Japan

[21] Appl. No.: 813,982

[22] Filed: Dec. 26, 1991

[30] Foreign Application Priority Data

Apr. 15, 1991 [JP] Japan .................. 3-81082
Jul. 10, 1991 [JP] Japan ................. 3-169528
Jul. 11, 1991 [JP] Japan ................. 3-170777

[51] Int. Cl.⁵ .............................. F16H 47/00
[52] U.S. Cl. ................................ 74/655; 60/469; 248/638
[58] Field of Search .............. 60/339, 469; 74/655, 74/730.1; 248/635, 638, 674; 464/81, 93; 475/83

[56] References Cited

U.S. PATENT DOCUMENTS

| 1,335,740 | 4/1920 | Kehoe | 464/81 |
|---|---|---|---|
| 1,398,773 | 11/1921 | Francke | 464/81 |
| 3,213,712 | 10/1965 | Swift | 74/730.1 |
| 3,798,924 | 3/1974 | Downey | 464/93 |
| 3,805,082 | 4/1974 | Murray | 60/469 X |
| 3,810,519 | 5/1974 | Galos et al. | 60/469 X |
| 3,901,096 | 8/1975 | Woody | 74/730.1 X |
| 3,902,567 | 9/1975 | Pekar, Jr. | 60/469 X |
| 4,111,003 | 9/1978 | Bolinger et al. | 60/469 |
| 4,516,955 | 5/1985 | Worner et al. | |
| 4,834,336 | 5/1989 | Shimazaki et al. | 248/638 X |
| 4,856,264 | 8/1989 | Nishimura et al. | 74/655 X |
| 4,862,767 | 9/1989 | Hauser | 475/83 |
| 4,938,448 | 7/1990 | Shimazaki | 248/638 X |
| 4,943,261 | 7/1990 | Smith | 464/81 X |
| 4,988,071 | 1/1991 | Shimazaki et al. | 248/635 X |
| 4,993,682 | 2/1991 | Imai et al. | 248/638 |
| 5,110,081 | 5/1992 | Lang, Jr. | 248/635 |
| 5,131,619 | 7/1992 | Daugherty et al. | 248/635 |
| 5,152,718 | 10/1992 | Cnofer | 464/93 |
| 5,154,403 | 10/1992 | Sato | 248/635 X |
| 5,160,113 | 11/1992 | Whiddon | 248/638 |

FOREIGN PATENT DOCUMENTS

| 4029575 | 4/1991 | Fed. Rep. of Germany . | |
| 2512148 | 3/1983 | France . | |
| 9201176 | 1/1992 | PCT Int'l Appl. . | |
| 616243 | 1/1949 | United Kingdom | 248/635 |
| 1242827 | 8/1971 | United Kingdom . | |

Primary Examiner—Dirk Wright
Attorney, Agent, or Firm—Gifford, Groh, Sprinkle, Patmore and Anderson

[57] ABSTRACT

A vibration and sound proofing system for a working vehicle such as a tractor or a lawn mower having a hydrostatic stepless transmission (HST) included in a propelling transmission system for transmitting engine output to wheels. The HST is mounted in a case secured to intermediate mounting plates attached to a gear transmission case through vibration and sound absorbers. Output shafts of the HST are connected to input shafts of a gear transmission through vibration absorbing shaft couplings.

Each of the vibration absorbers includes a metallic outer tube, a metallic inner tube disposed concentrically with the outer tube, and a rubber element filled tight in an annular space defined between the outer and inner tubes. The intermediate mounting plates are connected to the transmission case with the outer tubes inserted into bores defined in the intermediate mounting plates, by tightening bolts extending through the inner tubes and through spacers interposed between the inner tubes and the transmission case, respectively.

4 Claims, 9 Drawing Sheets

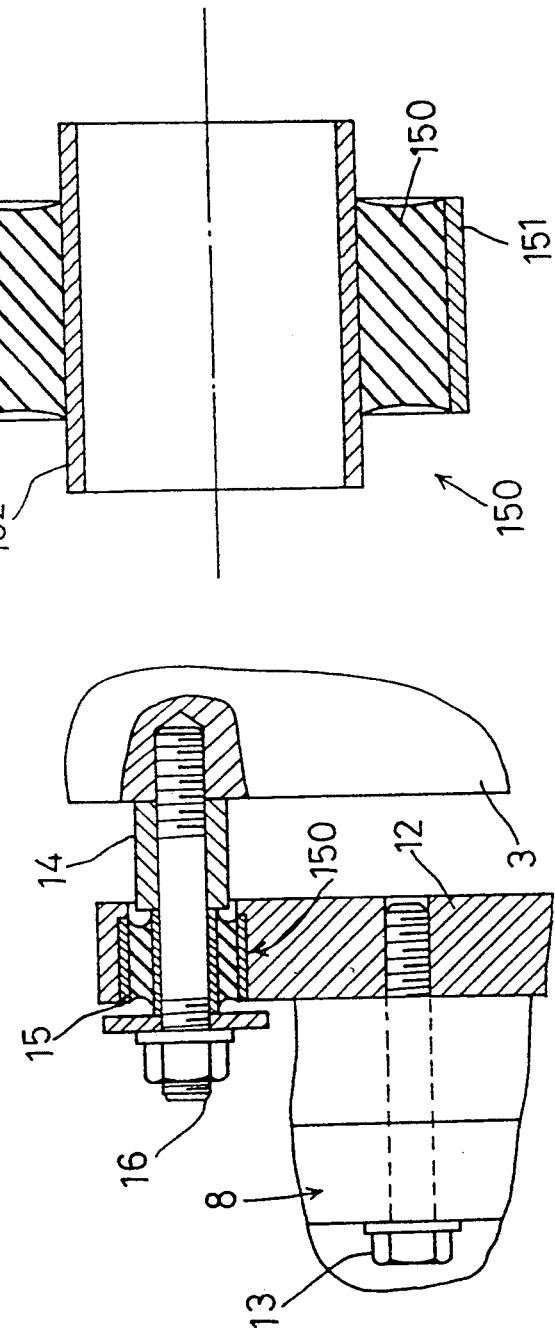

VIBRATION AND NOISE PROOFING SYSTEM FOR A HYDROSTATIC STEPLESS TRANSMISSION ATTACHED TO A TRANSMISSION CASE

BACKGROUND OF THE INVENTION

The present invention relates to a working vehicle such as a tractor or a lawn mower having a hydrostatic stepless transmission (HST) included in a propelling transmission system for transmitting engine output to wheels, and in particular to a vibration and noise proofing system of the working vehicle.

DESCRIPTION OF THE RELATED ART

In a working vehicle as noted above, generally, the hydrostatic stepless transmission (hereinafter referred to as the HST) is directly fixed to the wall of a gear transmission case opposed to the engine. The HST includes a plurality of pump-side plungers for successively feeding pressure oil, and a plurality of motor-side plungers successively operable by the pressure oil thus fed, to produce torque output. This construction tends to produce vibrations and noise due to pulsation of the pressure oil and other causes. The vibrations and solid-borne sounds are transmitted through the gear transmission case to the vehicle body. The vibrations and solid-borne sounds transmitted to a driver's section in particular cause discomfort to the driver. The noise propagating through the air is also unpleasant to the driver where a sufficient soundproofing measure is not provided around the transmission case.

SUMMARY OF THE INVENTION

The object of the present invention is to provide a vibration and noise proofing system for a hydrostatic stepless transmission, and more particularly to provide a vibration and noise proofing structure for reducing transmission of vibrations and noise from an HST case to a gear transmission case.

The above object is fulfilled, according to the present invention, by a construction in which an HST is mounted in a case attached to a gear transmission case through vibration and sound absorbing elements such as rubber elements.

Preferably, the HST is enclosed in a sound proofing cover.

However, positions of bolt holes or other mounting devices formed on the HST case are dependent on the shape and dimensions of the case, and are not necessarily suited for vibration proofing purposes.

In a preferred embodiment of the present invention, an HST is mounted in a case secured to intermediate mounting members attached to a gear transmission case through vibration and sound absorbers. Output shafts of the HST are connected to input shafts of a gear transmission through vibration absorbing shaft couplings. In this construction, the vibration and sound absorbers are interposed between the gear transmission case and the intermediate mounting members to which the HST case is secured. This allows the intermediate mounting members to be supported with a vibration suppressing effect, at positions different from the mounting positions of the HST case. Thus, a required number of vibration and sound absorbers may be arranged in effective positions with ease without remodeling the HST case to change the mounting positions.

Other features and advantages of the present invention will be apparent from the following description of the preferred embodiments to be had with reference to the drawings.

BRIEF DESCRIPTION OF THE DRAWINGS

FIG. 5 is a side view in vertical section of a vibration suppressing connection.

FIG. 6 is an enlarged sectional view of a vibration suppressing element.

DETAILED DESCRIPTION OF THE PREFERRED EMBODIMENTS

First Embodiment

Figure 1:
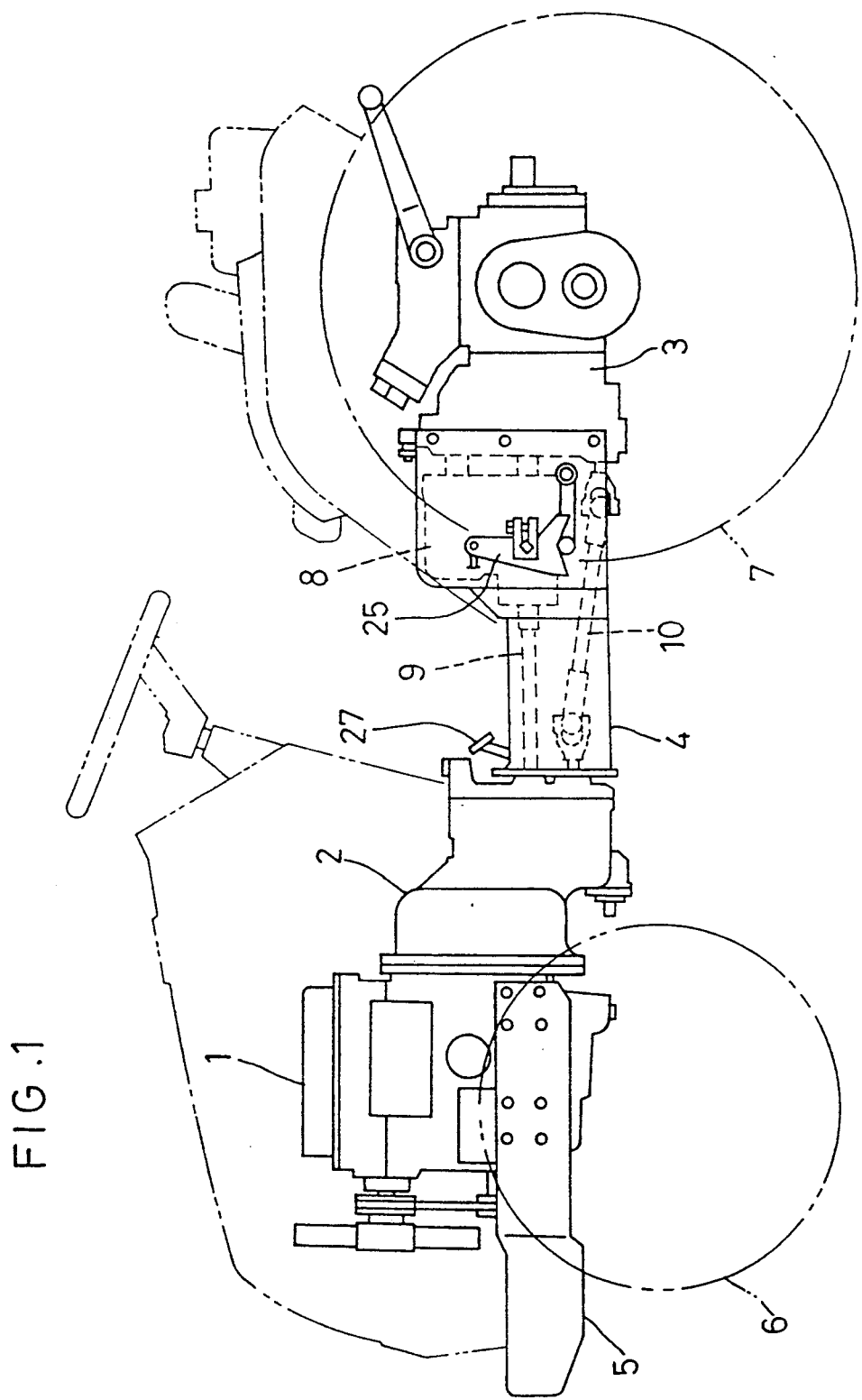
FIG. 1 is a side elevation of an agricultural tractor.

FIG. 1 shows a tractor as one example of working vehicles employing a vibration and noise proofing system according to the present invention. This tractor has an engine 1 mounted on a forward position of a body structure including a main clutch case 2 directly coupled to the engine 1, a rearward gear transmission case 3 connected to the main clutch housing 2 through a housing 4 formed of a sheet metal. A front frame 5 extends forwardly of the engine 1, by which front wheels 6 are journaled, while rear wheels are journaled by the gear transmission case 3.

The housing 4 contains a hydrostatic stepless transmission (HST) 8 mounted in a rear portion thereof and attached to the gear transmission case 3. The HST 8 receives drive through a clutch mounted in the main clutch case 2 and through a transmission shaft 9, effects a stepless change speed and backward and forward switching of the drive, and outputs the drive to a change speed gear mechanism mounted in the gear transmission case 3. The change speed gear mechanism effects a further change speed of the drive received, and transmits the drive through a differential to the rear wheels 7. The change speed gear mechanism may also divide out part of the drive for synchronously driving the front wheels 6 through a front wheel transmission shaft 10.

Figure 2:
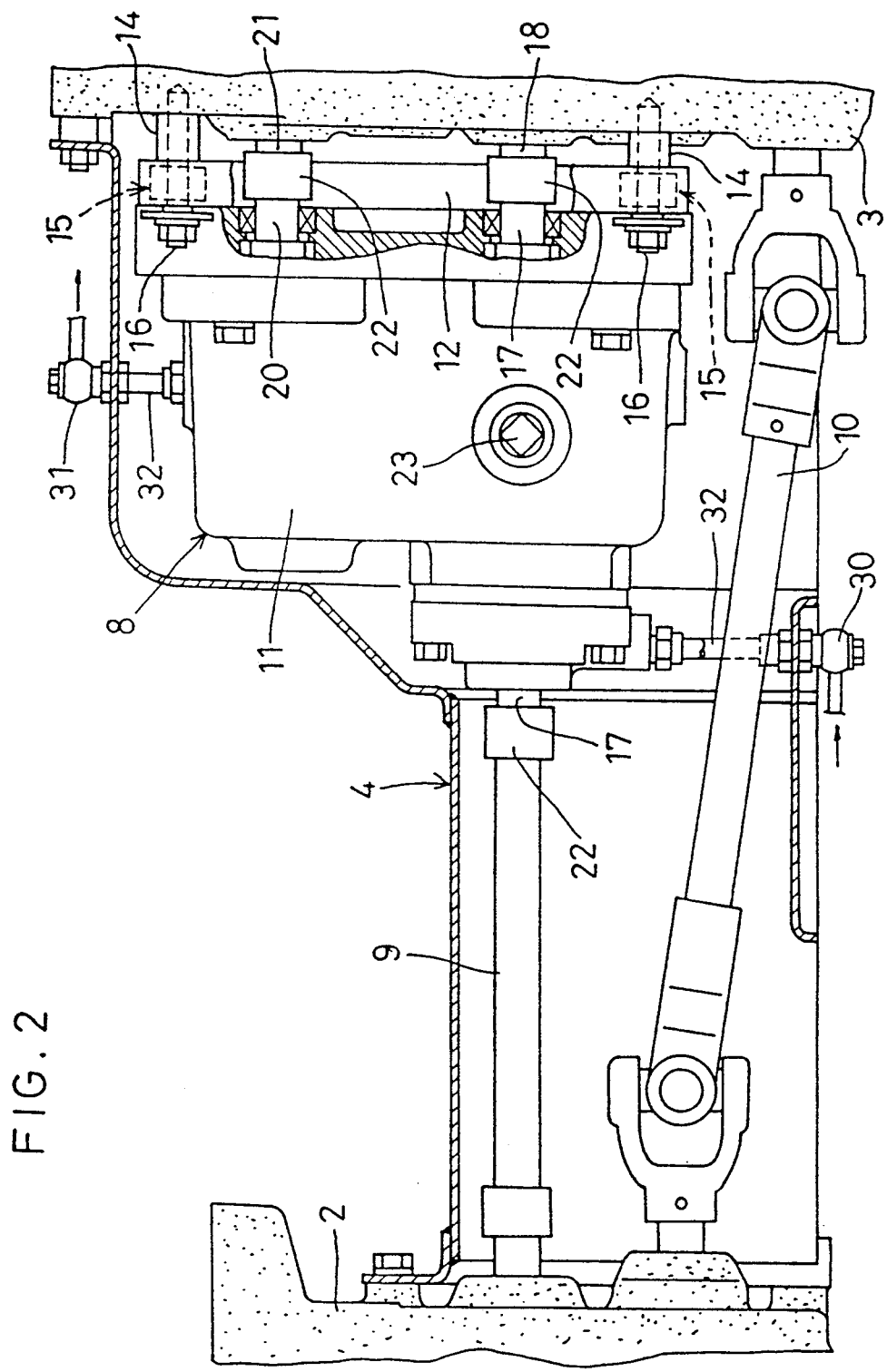
FIG. 2 is a side view, partly in section, of an HST mounting structure.
Figure 3:
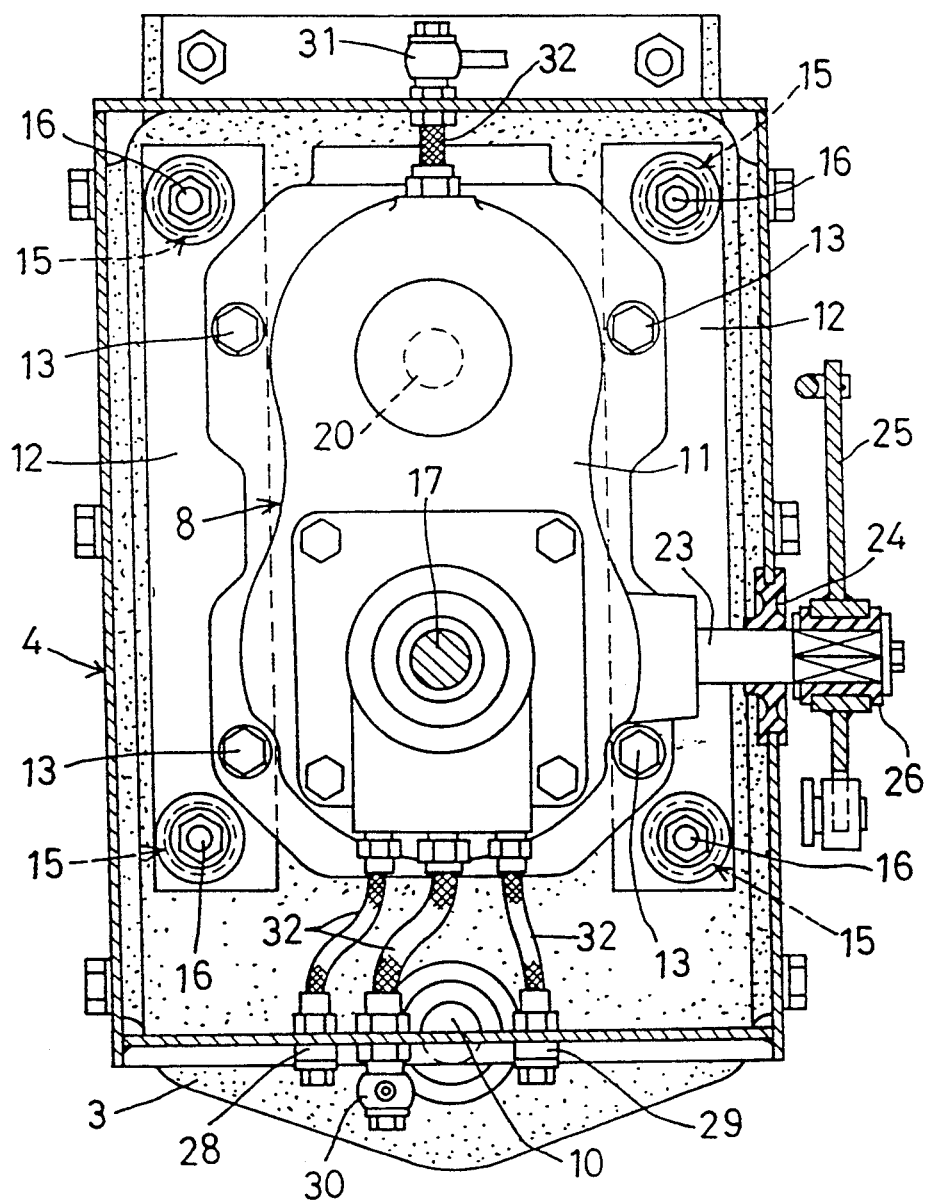
FIG. 3 is a front view of the HST mounting structure.
Figure 4:
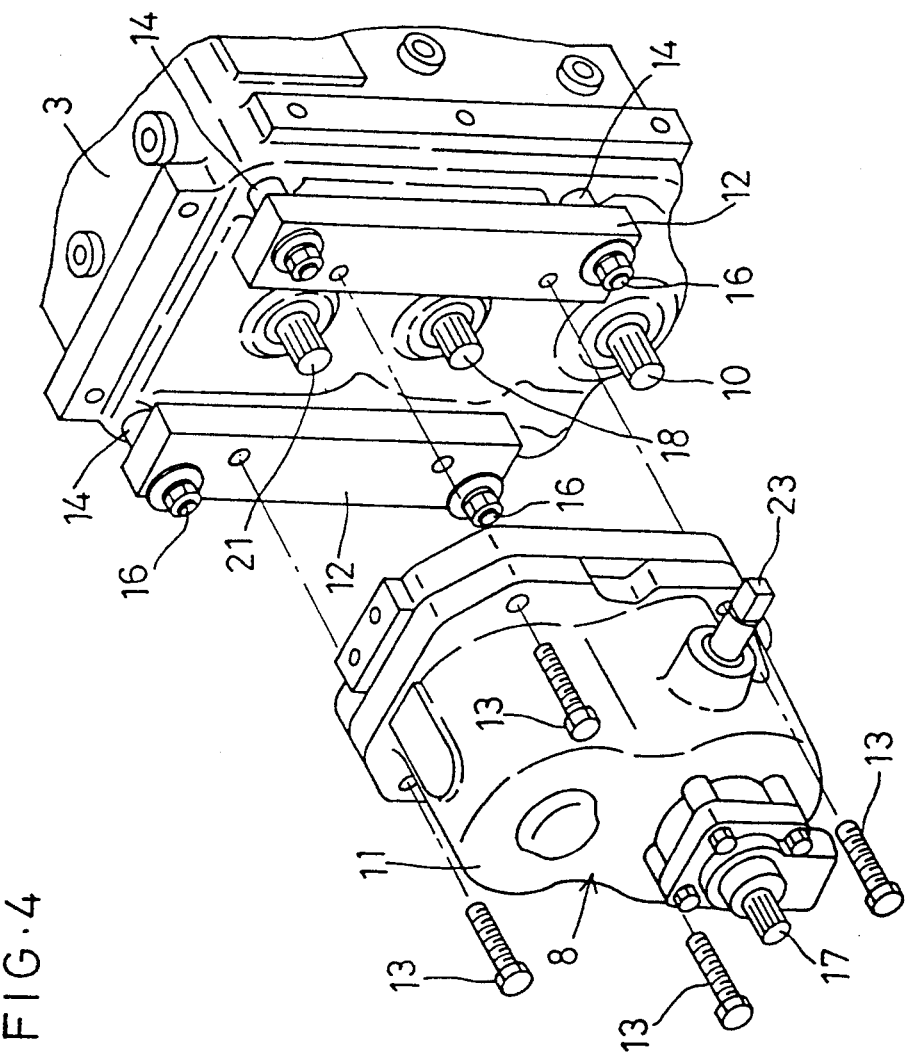
FIG. 4 is an exploded perspective view of the HST mounting structure.

As shown in FIGS. 2 through 4, the HST 8 is mounted in a case 11 rigidly connected to a pair of right and left intermediate mounting members 12 by a plurality of bolts 13. Each of the intermediate mounting members 12 is attached to a plurality of positions on a front wall of the gear transmission case 3 by bolts 16 and through spacer collars 14 and vibration stoppers 150 with a vibration and noise proofing effect as seen from FIG. 5. Each vibration stopper 150 includes a metallic outer tube 151, a metallic inner tube 152 longer than the outer tube 151, and a rubber ring 153 mounted in an annular space between and bonded to the outer and inner tubes 151 and 152. The vibration stopper 150 is inserted into a stepped bore 15 defined in the intermediate mounting member 12, with the spacer collar 14 extending between the transmission case 3 and inner tube 152. Each bolt 16 extends through the inner tube 152 and spacer collar 14 to be screwed to the gear transmission case 3, and threaded holes are defined in the latter for engaging the bolts 16. The spacer collar 14 has a dimension to contact the inner tube 152 but not the outer tube 151 or intermediate mounting member 12. Consequently, vibrations of the HST 8 or intermediate mounting members 12 must pass through the rubber rings 153, and are absorbed by the rubber rings 153, before reaching the gear transmission case 3.

The HST 8 is supported by the gear transmission case 3 with a vibration proofing effect as described above. Besides, the HST 8 is enclosed in the housing 4 to suppress propagation of noise of the HST 8.

In accord with the vibration proofing support for the HST 8, vibration absorbing ball joints 22 are provided for connections between the transmission shaft 9 and a forward end of an input shaft (pump shaft) 17 of the HST 8, between a rear end of the input shaft 17 and a PTO input shaft 18 of the gear transmission case 3, and between an output shaft (motor shaft) 20 of the HST 8 and a propelling drive input shaft 21 of the gear transmission case 3. Further, the HST 8 has a speed control shaft 23 projecting outward through a bore of the housing 4 having a rubber seal 24. The control shaft 23 has an outer end thereof connected to a control arm 25 through a vibration absorbing rubber 26, the control arm 25 being linked to a change speed pedal 27.

The housing 4 defines a pair of detection openings 28 and 29 for measuring oil pressures in a forward drive high pressure circuit and a backward drive high pressure circuit in the HST 8, a charge oil supply opening 30 and a charge oil drain opening 31. These openings are connected to corresponding ports of the HST 8 through rubber pipes 32, respectively.

Second Embodiment

Figure 7:
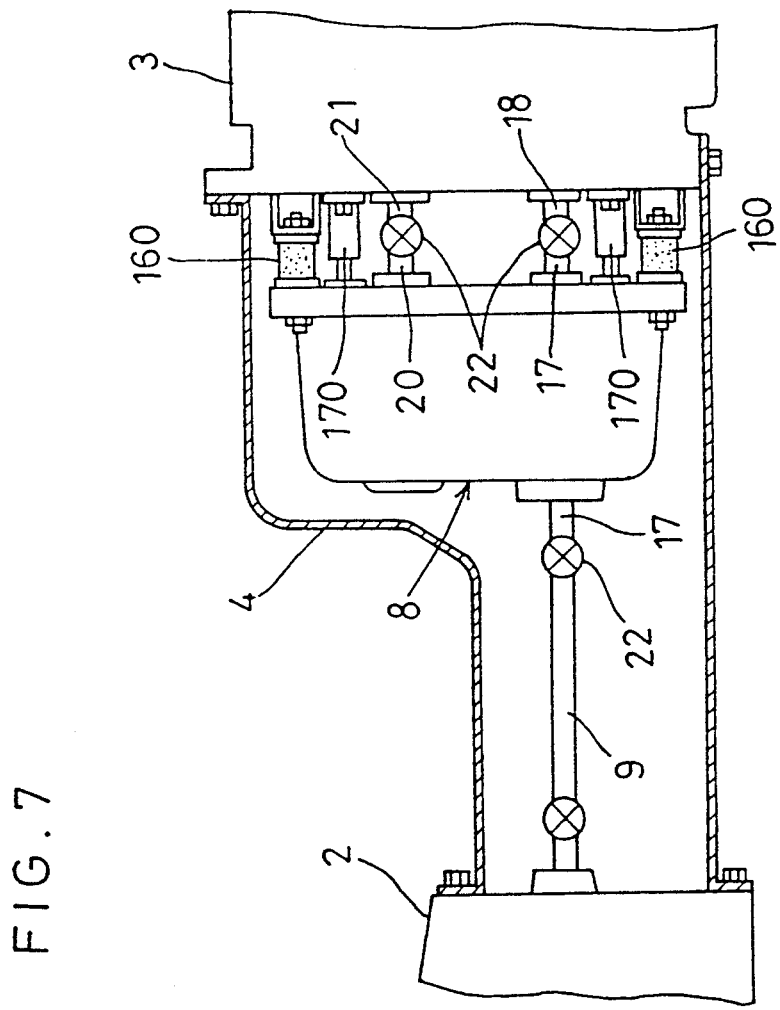
FIG. 7 is a side view of an HST mounting structure in a second embodiment of the present invention.

This embodiment differs from the first embodiment in that the HST 8 is secured to the gear transmission case 3 through vibration dampers without using the intermediate mounting members. Referring to FIG. 7. the HST 8 is connected with a vibration proofing effect to the front of the gear transmission case 3 through rubber vibration stoppers 160 and dampers 170. In this embodiment also, the HST 8 is enclosed in the housing 4 to suppress propagation of noise of the HST 8.

To promote the vibration proofing effect, as in the foregoing embodiment, vibration absorbing shaft couplings 22 are provided for connections between the transmission shaft 9 and the forward end of the input shaft (pump shaft) 17 of the HST 8, between the rear end of the input shaft 17 extending through the HST 8 and the PTO input shaft 18 of the gear transmission case 3, and between the output shaft (motor shaft) 20 of the HST 8 and the propelling drive input shaft 21 of the gear transmission case 3.

Figure 8:
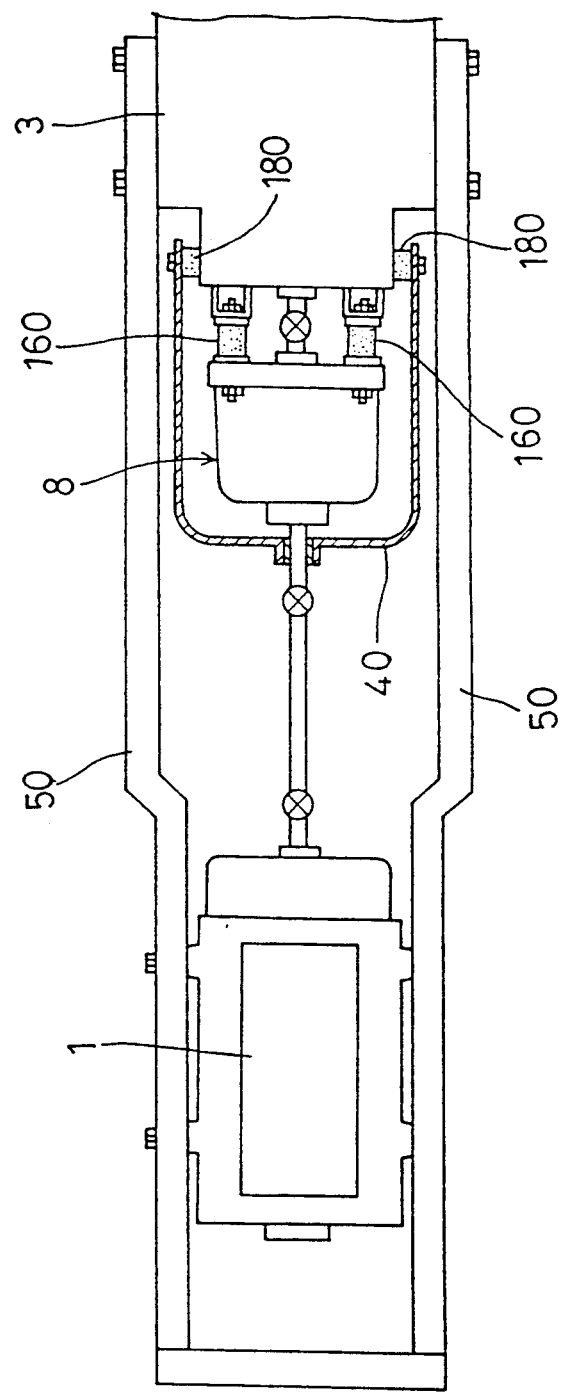
FIG. 8 is a plan view, partly in section, showing a modification of the HST mounting structure shown in FIG. 7.

FIG. 8 shows a modification of the second embodiment. Here, the engine 1 and gear transmission case 3 are interconnected through a pair of right and left main frames 50. The HST 8 is connected to the front of the gear transmission case 3 through the vibration stoppers 160, and enclosed in a sound proofing housing 40 connected to the gear transmission case 3 through vibration stoppers 180. In any case, the vibration stoppers have a vibration absorbing material through which vibrations are transmitted from the HST 8 to the gear transmission case 3.

Third Embodiment

Figure 9:
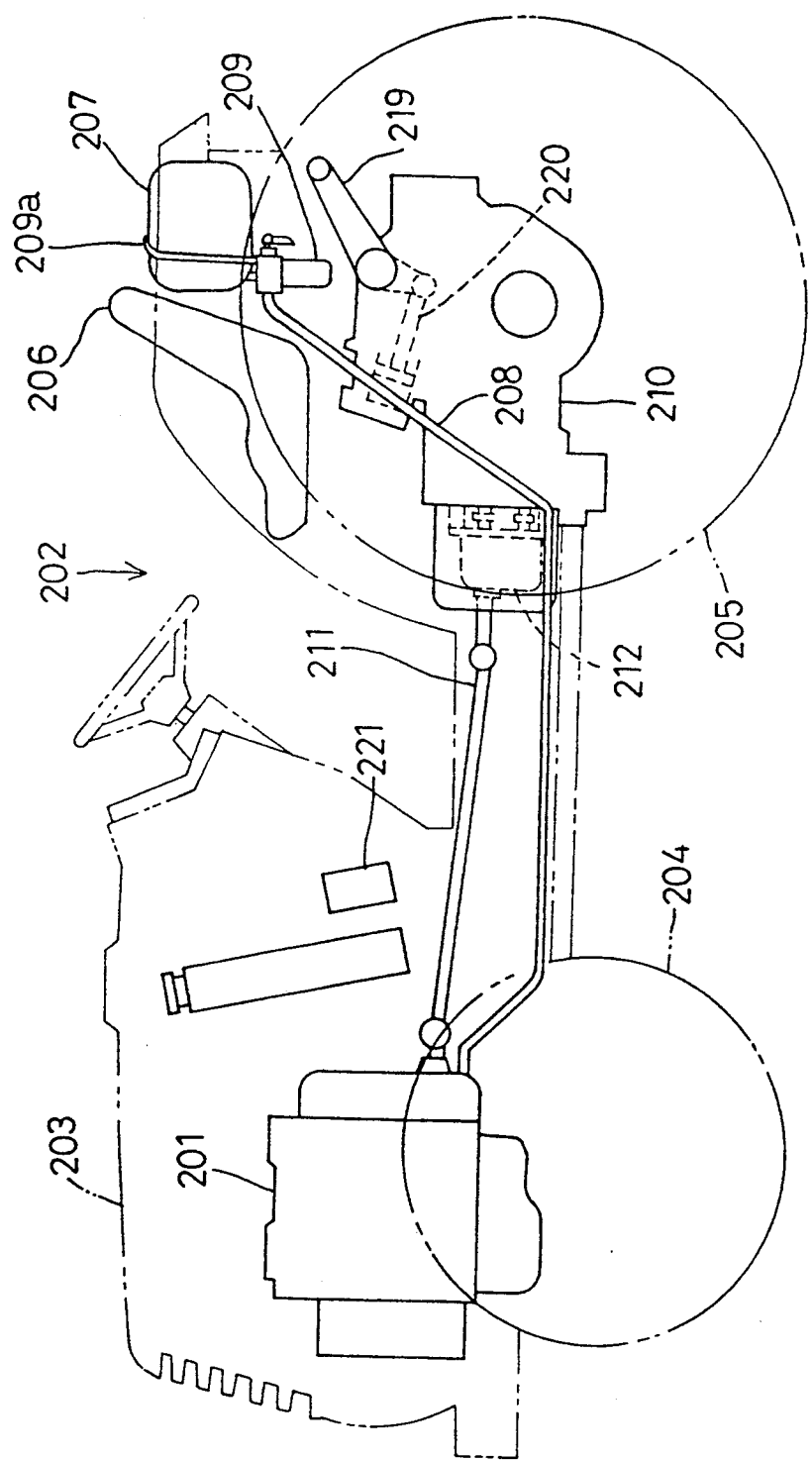
FIG. 9 is a side elevation of a tractor employing a third embodiment of the present invention.
Figure 10:
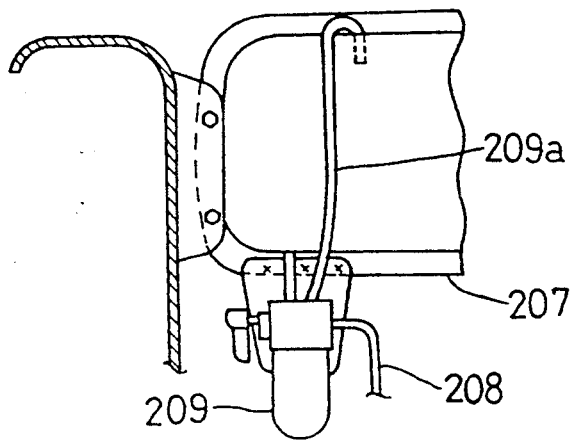
FIG. 10 is a side view of a fuel tank and a filter of the tractor shown in FIG. 9.

As shown in FIG. 9, a tractor employing this embodiment has an engine 201 and a driver's section 202 provided on a tractor body 203 supported by front wheels 204 and rear wheels 205. The driver's section 202 includes a driver's seat 206, and a fuel tank 207 is disposed rearwardly of the driver's seat 206 and between fenders of the rear wheels 205. A fuel pipe 208 extends from the fuel tank 207 to the engine 201, and includes a filter 209 disposed adjacent the fuel tank 207. As shown in FIG. 10, the filter 209 has an air vent pipe 209a extending to an upper position in the fuel tank 207.

Figure 11:
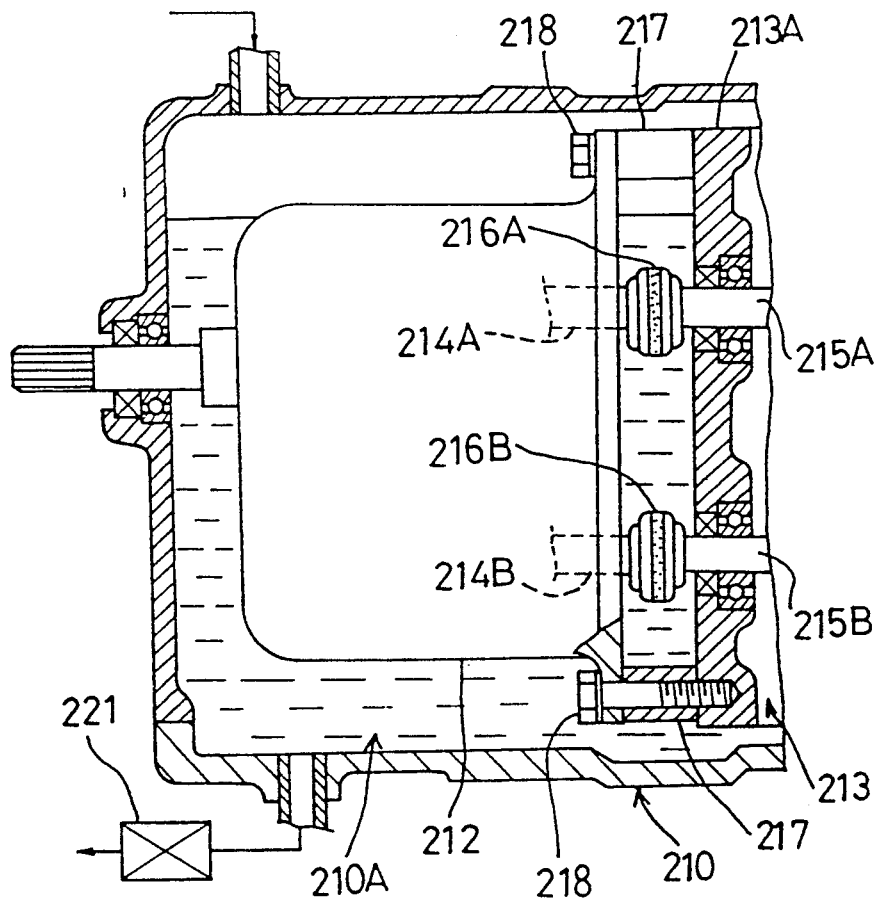
FIG. 11 is a side view in vertical section of an HST attached to a transmission case in the third embodiment.

Referring to FIGS. 9 and 11, drive is transmitted from the engine 1 to a transmission case 210 disposed in a rearward position of the tractor body 203, through a transmission shaft 211. The transmission case 210 contains an HST 212 mounted in a front portion thereof and operatively connected to the transmission shaft 211. The transmission case 210 also contains a change speed gear mechanism, not shown, mounted in a rear portion thereof. The HST 212 has a propelling drive output shaft 214A and a working implement driving PTO output shaft 214B drivingly connected to a propelling drive input shaft 215A and a PTO input shaft 215B of the change speed gear mechanism through elastic couplings 216A and 216B formed of hard rubber or the like to act as vibration stoppers, respectively. The HST 212 is connected to a front wall 213A partitioning the transmission case 210, by bolts 218 and through rubber vibration stoppers 217.

The HST 212 is mounted in a front chamber 210A of the transmission case 210 filled with hydraulic oil. The HST 212 receives, as charge oil for oil leaks, clean hydraulic oil from inside the front chamber 210A which is free from dust or the like resulting from gear wear. The hydraulic oil filling the front chamber 210A also prevents resonance of vibrations in the space within the front chamber 210. The transmission case 210 may define small bores to balance internal and external pressures of the front chamber 210A, thereby to check an internal stress due to the internal pressure. Further, as shown in FIG. 9, the hydraulic oil in the front chamber 210A is used for a hydraulic circuit to operate a hydraulic cylinder 220 that drives lift arms 219 for raising and lowering a working implement such as a rotary plow connected to the rear end of the tractor body 203. Numeral 221 in FIG. 11 denotes an oil cooler.

In the above construction, vibrations and noise generated by the HST 212 are attenuated by the elastic couplings 216A and 216B and vibration stoppers 217 in transmission to the transmission case 210. The hydraulic oil in the front chamber 210A also checks transmission of the vibrations and noise to the transmission case 210.

What is claimed is:

1. A vibration and noise-reducing apparatus for a working vehicle, comprising:
a hydrostatic stepless transmission having a housing;
an input shaft extending from a first end of said hydrostatic stepless transmission to a main clutch case;

an output shaft extending from a second end of said hydrostatic stepless transmission and to a gear transmission case;
a vibration proofing unit connecting said hydrostatic stepless transmission to said transmission case, said vibration proofing unit including:
  an intermediate mounting member integrally molded with said housing of said hydrostatic stepless transmission, said intermediate mounting member having at least one mounting bore extending parallel to said output shaft;
  a metallic outer tube inserted into said mounting bore;
  a metallic inner tube disposed concentrically with respect to said outer tube;
  a rubber element filling an annular space defined between said outer tube and said inner tube;
  a spacer extending from said gear transmission case to a point adjacent said inner tube so as to define a space between said hydrostatic stepless transmission and said transmission case;
  a bolt insertable through said inner tube and said spacer so as to mount said intermediate mounting member to said transmission case; and
vibration absorbing means mounted to said input shaft and said output shaft;
whereby noise and vibrations of said hydrostatic stepless transmission through said input and output shaft are substantially suppressed.

2. A working vehicle as claimed in claim 1, wherein said hydrostatic stepless transmission is enclosed in a sound proofing cover.

3. A working vehicle as claimed in claim 1, wherein said hydrostatic stepless transmission is mounted in an oil-filled chamber inside said transmission case.

4. The invention as defined in claim 1, further comprising a vibration absorbing coupling connecting a power take-off input shaft contained within said transmission case to a rear end of said input shaft.

* * * * *